(12) United States Patent
    Azaña Robles

(10) Patent No.: US 11,414,211 B2
(45) Date of Patent: Aug. 16, 2022

(54) TOWING VEHICLE

(71) Applicant: GOLDHOFER AG, Memmingen (DE)

(72) Inventor: Pedro Pablo Azaña Robles, Memmingen (DE)

(73) Assignee: GOLDHOFER AG, Memmingen (DE)

(*) Notice: Subject to any disclaimer, the term of this patent is extended or adjusted under 35 U.S.C. 154(b) by 1003 days.

(21) Appl. No.: 16/086,128

(22) PCT Filed: Mar. 17, 2017

(86) PCT No.: PCT/EP2017/056399
§ 371 (c)(1),
(2) Date: Sep. 18, 2018

(87) PCT Pub. No.: WO2017/158161
PCT Pub. Date: Sep. 21, 2017

(65) Prior Publication Data
US 2020/0298999 A1    Sep. 24, 2020

(30) Foreign Application Priority Data
Mar. 18, 2016 (DE) ...................... 10 2016 204 543.1

(51) Int. Cl.
*B60T 8/26* (2006.01)
*B64F 1/22* (2006.01)
*B60T 8/34* (2006.01)
*B60T 13/14* (2006.01)

(52) U.S. Cl.
CPC .............. *B64F 1/227* (2013.01); *B60T 8/266* (2013.01); *B60T 8/345* (2013.01); *B60T 13/143* (2013.01)

(58) Field of Classification Search
CPC . B60T 8/26; B60T 8/266; B60T 8/267; B60T 8/268; B64F 1/227

USPC .................................. 188/106 P; 303/186
See application file for complete search history.

(56) References Cited

U.S. PATENT DOCUMENTS

| | | | |
|---|---|---|---|
| 3,964,794 A | 6/1976 | Scholz | |
| 4,007,890 A | 2/1977 | Bremer et al. | |
| 4,258,958 A * | 3/1981 | Bloxham | B60T 13/686 |
| | | | 188/16 |

(Continued)

FOREIGN PATENT DOCUMENTS

| CN | 101380900 A | 3/2009 |
|---|---|---|
| CN | 101918277 A | 12/2010 |

(Continued)

OTHER PUBLICATIONS

German Application No. 102016204543.1, German Search Report dated Mar. 7, 2017.
International Application No. PCT/EP2017/056399, International Search Report and Written Opinion dated Jun. 21, 2017.
Chinese Application No. 201780018108.5, Chinese Office Action dated May 10, 2021, No English translation available, 7 pages.

*Primary Examiner* — Thomas J Williams
(74) *Attorney, Agent, or Firm* — Kilpatrick Townsend & Stockton LLP

(57) ABSTRACT

The invention relates to a towing vehicle (100) for maneuvering aeroplanes without using tow bars, comprising a braking device (130) having a first fluidically actuable braking circuit (148) which acts on the front wheels (106) and a second fluidically actuable braking circuit (150) which acts on the rear wheels (110). According to the invention, the braking device (130) further comprises a third fluidically actuable braking circuit (152), which likewise acts on the front wheels (106).

12 Claims, 3 Drawing Sheets

(56) References Cited

U.S. PATENT DOCUMENTS

| | | | |
|---|---|---|---|
| 4,418,966 A * | 12/1983 | Hattwig | B60T 8/266 |
| | | | 303/198 |
| 4,553,788 A | 11/1985 | Smith | |
| 4,795,004 A | 1/1989 | Bauer | |
| 4,848,852 A * | 7/1989 | Inoue | B60T 8/175 |
| | | | 303/155 |
| 4,923,253 A | 5/1990 | Pollner et al. | |
| 6,675,920 B1 | 1/2004 | Diez et al. | |
| 8,676,465 B2 * | 3/2014 | Oshima | B60T 8/1706 |
| | | | 701/90 |
| 9,731,721 B1 * | 8/2017 | Wilder | B60T 8/266 |
| 2005/0134111 A1 | 6/2005 | Reuter et al. | |
| 2011/0175438 A1 * | 7/2011 | Mlynarczyk | B60T 13/662 |
| | | | 303/20 |

FOREIGN PATENT DOCUMENTS

| | | |
|---|---|---|
| CN | 102387947 A | 3/2012 |
| CN | 103662072 A | 3/2014 |
| CN | 104093612 A | 10/2014 |
| CN | 104875732 A | 9/2015 |
| CN | 105189222 A | 12/2015 |
| DE | 3732647 | 4/1989 |
| DE | 19919878 | 8/2000 |
| DE | 19919878 C1 | 8/2000 |
| DE | 19931865 | 1/2001 |

\* cited by examiner

TOWING VEHICLE

The invention relates to a towing vehicle for maneuvering aeroplanes without using tow bars, comprising a chassis, at least one front axle having at least two front wheels, at least one rear axle having at least two rear wheels, and a braking device having a first fluidically actuable braking circuit which acts on the front wheels and a second fluidically actuable braking circuit which acts on the rear wheels.

Towing vehicles of this type are generally known. They conventionally comprise a substantially U-shaped chassis which has a receiving chamber for the nose wheel of the aeroplane to be maneuvered. When the nose wheel is located in the receiving chamber, it can be gripped by means of a gripping device and lifted by means of a lifting device. The gripping device and the lifting device together form a coupling device of the towing vehicle.

Towing vehicles of this type are used for example to shift aeroplanes from the parking position thereof at the terminal back to the apron after passengers have embarked, the doors have been closed, and the passenger boarding bridge has been withdrawn. Further, aeroplanes may be moved towards the runway or to maintenance halls by means of towing vehicles of this type. Tow-bar-free towing vehicles, which grip and lift the nose wheel of the aeroplane to be maneuvered, have the advantage over tow bar haulers that they themselves only need to have a comparatively low weight, since in addition to the inherent weight thereof the load of the nose wheel is also transmitted onto them, increasing the traction thereof on the travel surface.

Nonetheless, during operation of this towing vehicle the "jack-knifing effect" can occur. This effect can occur when the towing vehicle is braked, in particular during full braking, when the rear wheels of the towing vehicle have to use the entirety of the available static friction force for braking, in such a way that there is no longer any force component available for lateral guidance of the rear wheels. In this state, there is the risk that the rear wheels may skid laterally, in such a way that the rear of the towing vehicle swerves and the entire towing vehicle rotates about the axis formed by the nose wheel suspension of the aeroplane. This results in a risk of damage not only for the wheel suspension of the nose wheel but also for the fuselage of the aeroplane.

There is a particular risk of the jack-knife effect occurring if only a small load is resting on the nose wheel of the aeroplane, for example as a result of tail-heaving loading or fueling of the aeroplane.

The jack-knifing effect is also known from articulated lorries. In this case, it is usually counteracted using electronic stabilisation systems, which among other things also act on the braking circuits of the semitrailer and thus keep the lorry largely straight. The use of stabilisation systems of this type is not possible in the field of towing vehicles for maneuvering aeroplanes without towing bars, since the towing pair is braked solely and only by the towing vehicle, the aeroplane taking on the role of an unbraked semitrailer.

Therefore, the object of the present invention is to develop towing vehicles of the aforementioned type in such a way that the jack-knifing effect is counteracted.

This object is achieved according to the invention by a towing vehicle of the aforementioned type, in which the braking device further comprises a third fluidically actuable braking circuit which likewise acts on the front wheels.

In this case, the two braking circuits prescribed by licensing requirements are formed by the first and the third braking circuit, which both act on the two front wheels. By corresponding actuation of the second braking circuit, which acts on the two rear wheels, it can be ensured, if this is actually actuated, that the traction force available at the rear wheels can be used at least in part, preferably even entirely, for lateral guidance of the rear wheels.

It is true that wheel braking units which can be assigned to two braking circuits are known in the art. In principle, it is also conceivable in connection with the present invention to arrange wheel braking units of this type on the front wheels of the towing vehicle. However, as a result of the high braking forces which have to be transferred to the brake discs when a towing train formed by a towing vehicle and an aeroplane is braked, it is advantageous for at least one, preferably each, of the front wheels to be assigned two wheel braking units, of which one is part of the first braking circuit and the other is part of the third braking circuit. In particular, in this case it is possible in a constructionally simple manner to keep low the contact pressure required for braking, which results from the clamping force exerted on the brake pads or the spreading force exerted on the brake shoes, in such a way that brake pads and brake shoes made of conventional materials can be used. This has an advantageous effect on the production and maintenance costs of the towing vehicle according to the invention.

As was stated previously above, it is advantageous if the second braking circuit assigned to the rear wheels is used for braking the towing vehicle only when absolutely necessary. Therefore, a development of the invention proposes that the braking device comprises a control unit which is configured to actuate the wheel braking units of the second braking circuit only when the admissible total weight of the aeroplane exceeds a predetermined value. This predetermined value may for example be 200 t. When the admissible total weight of the aeroplane is below the predetermined value, the braking power of the two front axle braking circuits, in other words the first and third braking circuits, is sufficient to be reliably able to brake the pair formed by the towing vehicle and the aeroplane. In this case, the force transferable to the travel surface via the wheels of the rear axle can be exploited in its entirety for lateral guidance. However, if the admissible total weight of the aeroplane is above the predetermined value, the second braking circuit assigned to the rear axle can also be used for braking.

Nonetheless, sufficient lateral guidance of the rear wheels can be provided in this situation too. As a result of the greater weight of the aeroplane, the nose wheel also exerts a correspondingly greater nose wheel load on the towing vehicle. This increases the level of the overall available static friction force of the rear wheels. Since a predetermined guidance force is sufficient to ensure lateral guidance, the component of the static friction force exceeding the predetermined guidance force can be used for braking.

When the aeroplane is coupled to the towing vehicle, when the nose wheel is gripped the diameter thereof is usually determined, and a selection of aeroplane types of which the nose wheels have a corresponding diameter is displayed to the driver on a display. The coupling process is continued, in other words the nose wheel is lifted, only when the driver has inputted and confirmed the associated aeroplane type. According to the invention, this information may also be passed on to the aforementioned control unit of the braking device, which determines the admissible total weight of the aeroplane on the basis of this information. Alternatively, it is naturally also possible for the admissible total weight of the aeroplane type to be conveyed directly to the control unit of the braking device as a function of the aeroplane type inputted by the driver.

It should further be added that the wheels of at least one of the axles of the towing vehicle are steerable wheels.

Hereinafter, the invention is described in greater detail by way of an embodiment, with reference to the accompanying drawings, in which.

Figure 1:
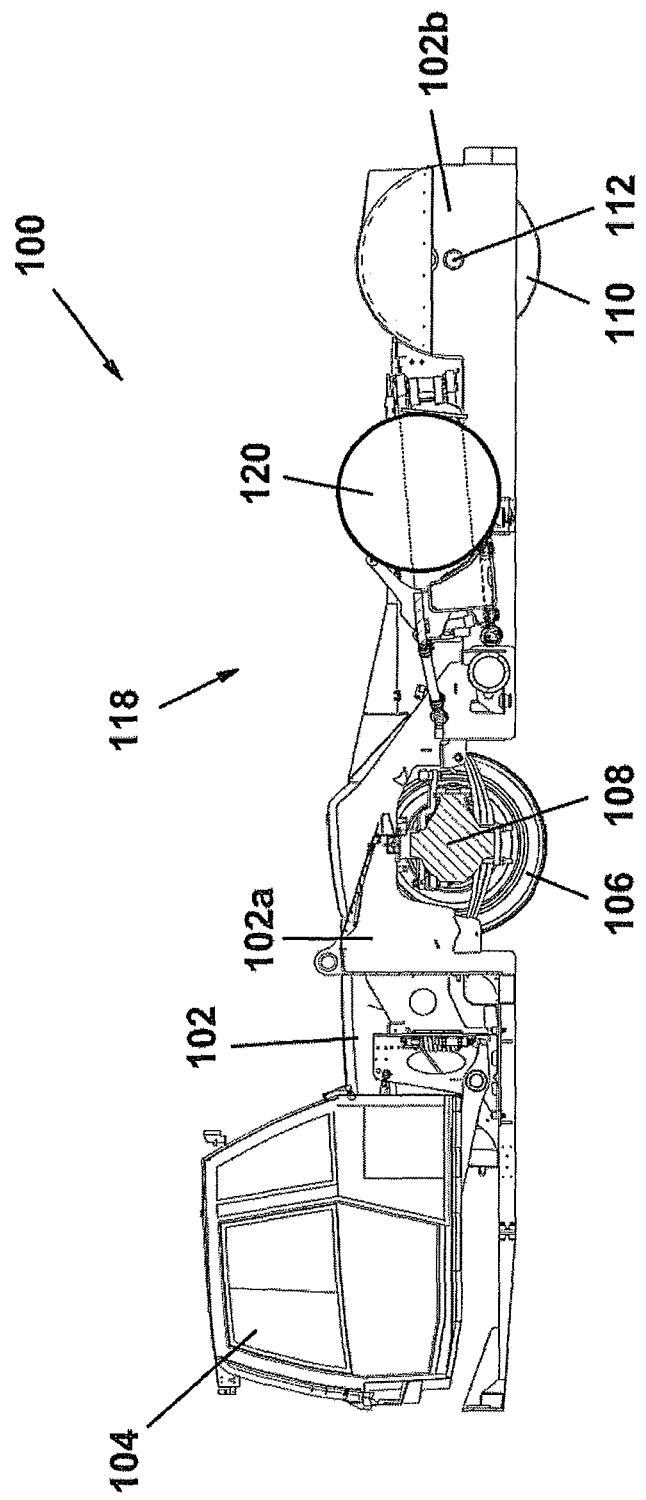
FIG. 1 is a partially sectional side view of a towing vehicle according to the invention.
Figure 2:
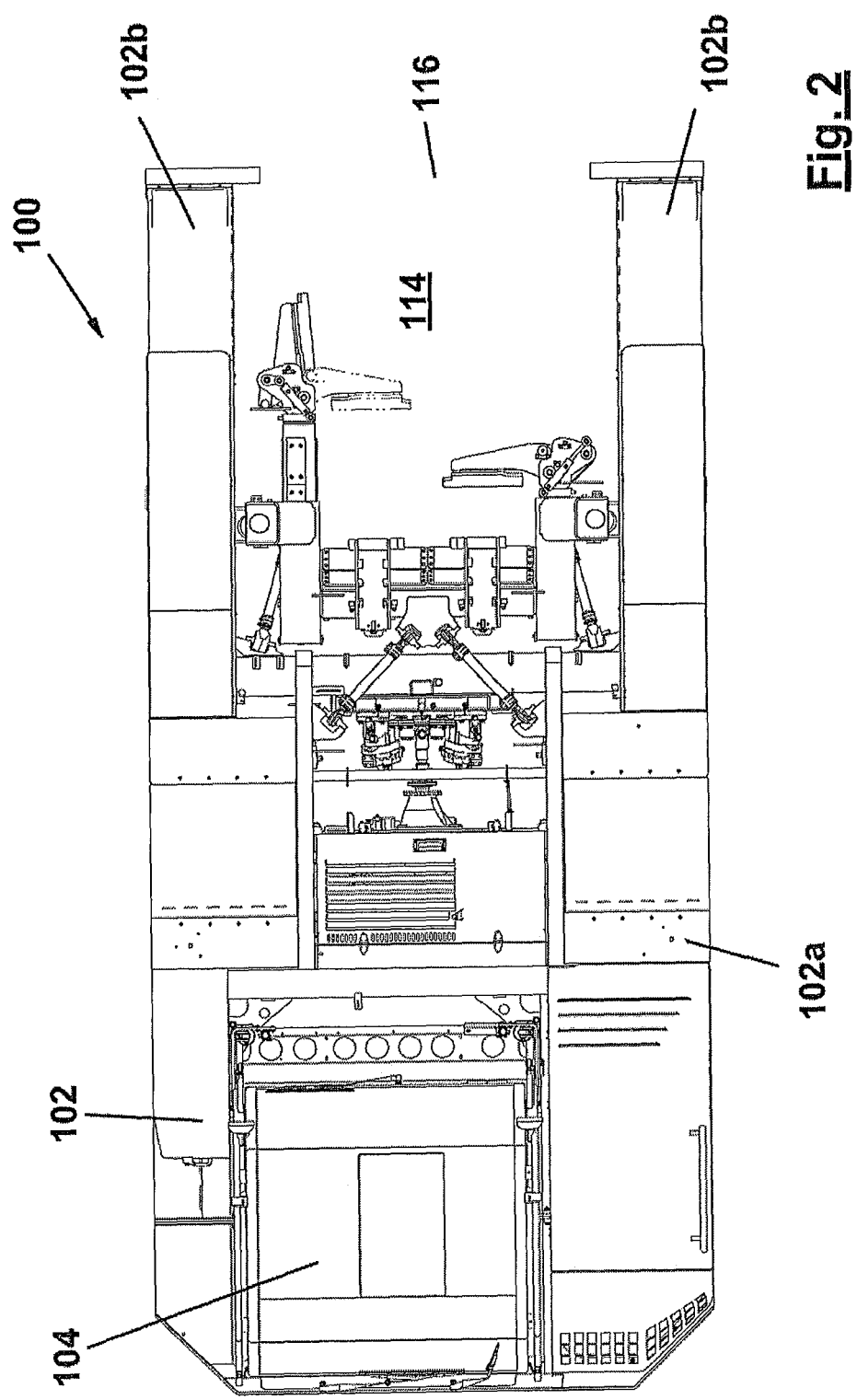
FIG. 2 is a plan view of the towing vehicle according to FIG. 1, but with the nose wheel of the aeroplane not shown.

In FIGS. 1 and 2, a towing vehicle according to the invention is denoted as a whole as 100. The towing vehicle 100 comprises a substantially U-shaped chassis 102 comprising a driver's cab 104. The wheels 106 of a front axle 108 of the towing vehicle 100 are assigned to a base limb 102a of the U shape of the chassis 102. Analogously, the wheels 110 of a rear axle 112 of the towing vehicle 100 are each assigned to one of the side limbs 102b of the U shape of the chassis 102. The two side limbs 102b together with the base limb 102a enclose a receiving chamber 114, which has a receiving opening 116 at the rear end of the towing vehicle 100. A coupling device 118 is arranged in the receiving chamber 114, and serves to grip and lift a nose wheel 120 arranged in the receiving chamber 114. The construction and functionality of the coupling device 118 are known per se and are therefore not to be explained in greater detail herein.

Figure 3:
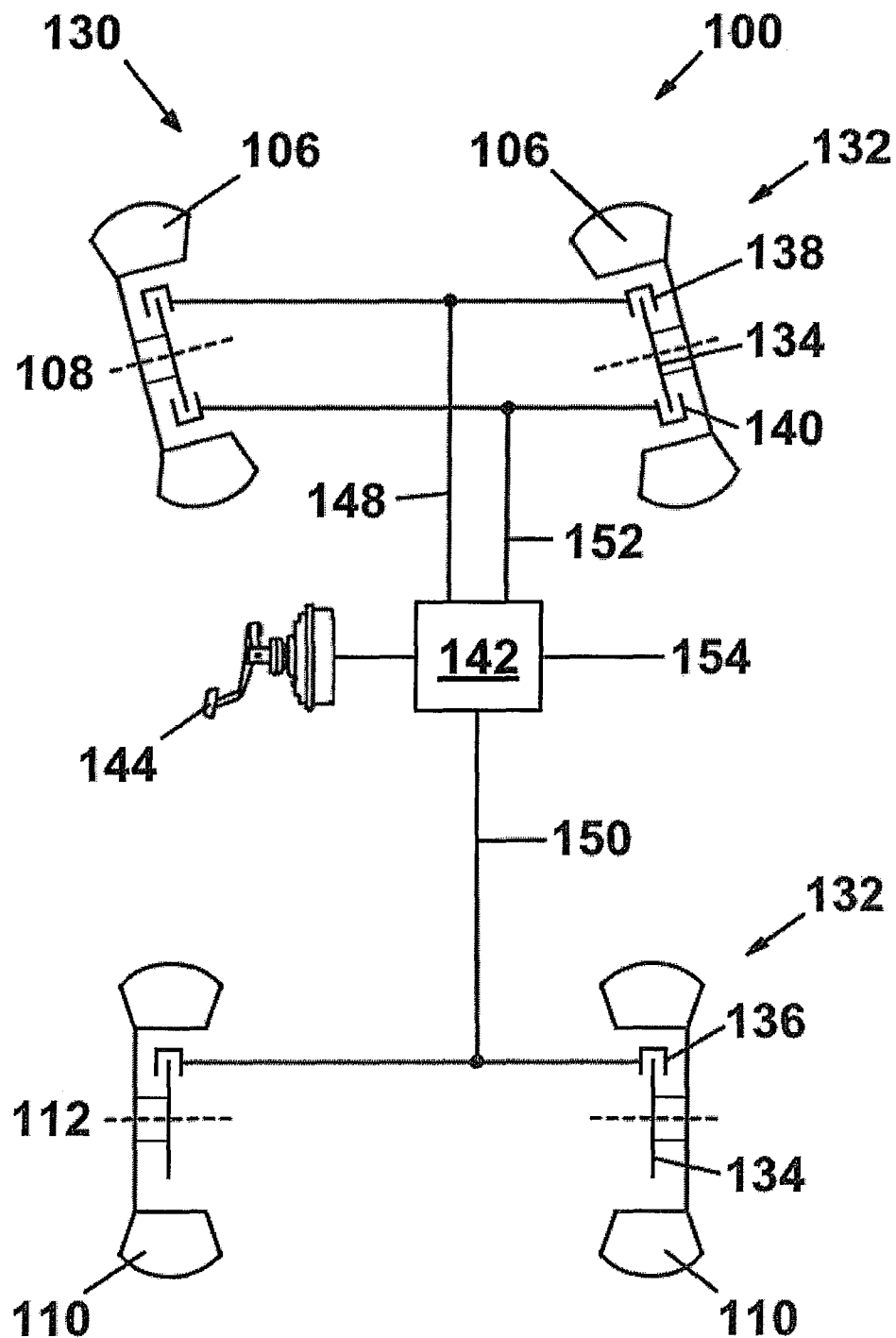
FIG. 3 is a schematic drawing illustrating the braking process of the towing vehicle according to the invention.

FIG. 3 schematically shows the braking device 130 of the towing vehicle 100. Each of the wheels 106 and 110 of the towing vehicle is assigned a braking arrangement 132, which comprises a brake disc 134 fixed to the wheel 106 or 110. The braking arrangements 132 of the rear wheels 110 each comprise a brake calliper 136, and the braking arrangements 132 of the front wheels 106 each comprise two braking callipers 138 and 140. The braking callipers 136, 138, 140, which cooperate with the brake discs 134 via brake pads (not shown), form the wheel braking units within the meaning of the present application.

The braking device 130 further comprises a control unit 142, to which a brake actuation signal is supplied by a brake actuation means 144. Three braking circuits proceed from the control unit 142, specifically a first braking circuit 148, which leads to the braking callipers 138 of the two front wheels 106, a second braking circuit 150, which leads to the braking callipers 136 of the two rear wheels 110, and a third braking circuit 152, which leads to the braking callipers 140 of the two front wheels 106. Further, information which specifies the admissible total weight of the associated coupled aeroplane or from which said admissible total weight can be derived may be supplied to the control unit 142 via a signal line 154.

For example, the control unit 142 may control the three braking circuits 148, 150 and 152 in such a way that when the admissible total weight of the aeroplane does not exceed a predetermined value, for example 200 t, only the first braking circuit 148 and the third braking circuit 152 are used for braking, in other words the towing vehicle 100 is braked exclusively via the wheels 106 of the front axle 108. In this case, the static friction force of the rear wheels 110 can be used in its entirety for lateral guidance. If the admissible total weight of the aeroplane exceeds the predetermined value, the control unit 142 can also use the brake circuit 150 assigned to the rear wheels 110 for braking. Nonetheless, sufficient lateral guidance of the rear wheels can be provided in this situation, too. As a result of the greater weight of the aeroplane, the nose wheel exerts a correspondingly greater nose wheel load on the towing vehicle 100. This increases the overall available static friction force of the rear wheels 110. Since a predetermined guidance force is sufficient to ensure lateral guidance, the component of the static friction force exceeding said predetermined guidance force is available for braking.

It should further be added that although the wheel braking units are all schematically shown as braking callipers 136, 138, 140 in the above embodiment, other brake types may also be used, for example drum brakes or multi-disc brakes. For example, in a specific embodiment, disc brakes could be assigned to the front wheels 106 whilst drum brakes are assigned to the rear wheels 110.

The invention claimed is:

1. A towing vehicle for maneuvering an aircraft without using tow bars, comprising:
   a chassis;
   at least one front axle having at least two front wheels;
   at least one rear axle having at least two rear wheels;
   a braking device having a first fluidically actuable braking circuit which acts on the front wheels and a second fluidically actuable braking circuit which acts on the rear wheels; and
   a third fluidically actuable braking circuit which acts on the front wheels,
   wherein the braking device comprises a control unit which is configured to control (i) the second fluidically actuable braking circuit when a weight of the aircraft exceeds a predetermined value, and (ii) when the weight of the aircraft does not exceed the predetermined value, to control only the first fluidically actuable braking circuit and the third fluidically actuable braking circuit, such that the towing vehicle is braked exclusively by means of the front wheels of the front axle.

2. The towing vehicle according to claim 1, wherein at least one of the front wheels is assigned two wheel braking units, wherein one of the two wheel braking units is part of the first fluidically actuable braking circuit and another of the two wheel braking units is part of the third fluidically actuable braking circuit.

3. The towing vehicle according to claim 1, wherein the chassis of the towing vehicle is substantially U-shaped and encloses a receiving chamber, which has a receiving opening formed between two free ends of side limbs of the U shape, and wherein the receiving chamber further comprises a coupling device for gripping and lifting a nose wheel of the aircraft to be maneuvered.

4. The towing vehicle according to claim 1, wherein the weight of the aircraft is an admissible total weight.

5. The towing vehicle according to claim 1, wherein:
   controlling the second fluidically actuable braking circuit when the weight of the aircraft exceeds the predetermined value includes actuating a respective wheel brake unit of the second fluidically actuable braking circuit, and
   controlling only the first fluidically actuable braking circuit and the third fluidically actuable braking circuit when the weight of the aircraft does not exceed the predetermined value includes actuating additional respective wheel brake units of the first fluidically actuable braking circuit and the third fluidically actuable braking circuit without actuating the respective wheel brake unit of the second fluidically actuable braking circuit.

6. The towing vehicle according to claim 1, wherein:
the first fluidically actuable braking circuit includes a set of front wheel braking units that is assigned to each of the at least two front wheels,
the third fluidically actuable braking circuit includes an additional set of front wheel braking units that is assigned to each of the at least two front wheels, and
the second fluidically actuable braking circuit includes a set of rear wheel braking units that is assigned to each of the at least two rear wheels.

7. A towing vehicle for maneuvering an aircraft without using tow bars, comprising:
a substantially U-shaped chassis comprising a coupling device for gripping and lifting a nose wheel of an aircraft;
at least one front axle having at least two front wheels;
two front wheel braking units assigned to at least one of the front wheels;
at least one rear axle having at least two rear wheels;
a rear wheel braking unit assigned to at least one of the rear wheel;
a braking device comprising:
  a first fluidically actuable braking circuit configured to act on the front wheels, wherein the first fluidically actuable braking circuit comprises a front braking unit of the two front wheel braking units,
  a second fluidically actuable braking circuit configured to act on the rear wheels wherein the second fluidically actuable braking circuit comprises the rear wheel braking unit,
  a third fluidically actuable braking circuit configured to act on the front wheels, wherein the third fluidically actuable braking circuit comprises an additional front braking unit of the two front wheel braking units; and
  a control unit configured to (i) control the second fluidically actuable braking circuit to brake the aircraft via the rear wheel braking unit when a weight of the aircraft exceeds a predetermined value, and (ii) control only the first fluidically actuable braking circuit and the third fluidically actuable braking circuit to brake the aircraft via the front wheel braking units when the weight of the aircraft does not exceed the predetermined value.

8. The towing vehicle according to claim 7, wherein the substantially U-shaped chassis encloses a receiving chamber.

9. The towing vehicle according to claim 8, wherein the substantially U-shaped chassis includes two side limbs of the U shape, in which two free ends of the two side limbs form a receiving opening of the receiving chamber.

10. The towing vehicle according to claim 7, wherein the weight of the aircraft is an admissible total weight.

11. The towing vehicle according to claim 7, wherein:
controlling the second fluidically actuable braking circuit when the weight of the aircraft exceeds the predetermined value includes actuating the rear wheel braking unit, and
controlling only the first fluidically actuable braking circuit and the third fluidically actuable braking circuit when the weight of the aircraft does not exceed the predetermined value includes actuating the front braking unit and the additional front braking unit without actuating the rear wheel braking unit.

12. The towing vehicle according to claim 7, wherein:
the front braking unit is included in a set of front wheel braking units, wherein each particular wheel of the at least two front wheels is assigned to a particular unit of the set of front wheel braking units,
the additional front braking unit is included in an additional set of front wheel braking units, wherein each particular wheel of the at least two front wheels is assigned to an additional particular unit of the additional set of front wheel braking units, and
the rear wheel braking unit is included in a set of rear wheel braking units, wherein each particular wheel of the at least two rear wheels is assigned to a particular unit of the set of rear wheel braking units.

* * * * *